US012779468B2

(12) United States Patent
Pugliese et al.

(10) Patent No.: US 12,779,468 B2
(45) Date of Patent: Nov. 3, 2026

(54) TARGET PARTICLE EJECTION FROM RECIRCULATING FLUID EJECTION CHANNELS

(71) Applicant: Hewlett-Packard Development Company, L.P., Spring, TX (US)

(72) Inventors: Roberto A. Pugliese, Corvallis, OR (US); Kathryn H. Cyr, Corvallis, OR (US); Michael J. Day, Corvallis, OR (US); Diane R. Hammerstad, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 733 days.

(21) Appl. No.: 18/011,502

(22) PCT Filed: Jun. 26, 2020

(86) PCT No.: PCT/US2020/039789
§ 371 (c)(1),
(2) Date: Dec. 19, 2022

(87) PCT Pub. No.: WO2021/262191
PCT Pub. Date: Dec. 30, 2021

(65) Prior Publication Data

US 2023/0256440 A1 Aug. 17, 2023

(51) Int. Cl.

| | |
|---|---|
| ***G01N 15/10*** | (2024.01) |
| ***B01L 3/00*** | (2006.01) |
| ***G01N 1/20*** | (2006.01) |
| ***G01N 1/34*** | (2006.01) |

(Continued)

(52) U.S. Cl.
CPC .......... *B01L 3/502761* (2013.01); *G01N 1/34* (2013.01); *B01L 2200/0652* (2013.01); *B01L 2300/0636* (2013.01); *B01L 2300/088* (2013.01); *G01N 2015/1006* (2013.01); *G01N 2015/1024* (2024.01); *G01N 2015/1028* (2024.01); *G01N 2015/1029* (2024.01); *G01N 15/1031* (2013.01)

(58) Field of Classification Search
None
See application file for complete search history.

(56) References Cited

U.S. PATENT DOCUMENTS

| | | | |
|---|---|---|---|
| 3,710,933 | A | 1/1973 | Fulwyler et al. |
| 6,120,735 | A | 9/2000 | Zborowski et al. |
| 8,820,538 | B1 | 9/2014 | Lin |

(Continued)

FOREIGN PATENT DOCUMENTS

| | | | |
|---|---|---|---|
| WO | 2011/086990 | A1 | 7/2011 |

*Primary Examiner* — Neil N Turk
(74) *Attorney, Agent, or Firm* — Foley & Lardner LLP

(57) ABSTRACT

In one example in accordance with the present disclosure, am ejection system is described. The ejection system includes a fluid feed slot to supply fluid to a number of fluid ejection channels where each fluid ejection channel is a recirculating channel. Each fluid ejection channel includes a sensor to detect, in the fluid, a target particle to be ejected and a fluid ejector to eject the target particle from the fluid ejection channel. The ejection system also includes a controller to selectively activate the fluid ejector when the target particle presence is detected. Non-target particles are returned to the fluid feed slot past the fluid ejector.

13 Claims, 8 Drawing Sheets

(51) Int. Cl.
*G01N 35/10* (2006.01)
*G01N 15/1031* (2024.01)

(56) References Cited

U.S. PATENT DOCUMENTS

| | | | |
|---|---|---|---|
| 9,304,065 | B2 | 4/2016 | Fowler et al. |
| 2002/0064809 | A1 | 5/2002 | Mutz et al. |
| 2008/0261295 | A1 * | 10/2008 | Butler .................... C12M 47/04 436/53 |
| 2013/0155135 | A1 | 6/2013 | Govyadinov et al. |
| 2013/0183747 | A1 | 7/2013 | Fukuda et al. |
| 2015/0091989 | A1 | 4/2015 | Govyadinov et al. |
| 2015/0268244 | A1 | 9/2015 | Cho et al. |
| 2015/0362420 | A1 | 12/2015 | Espinoza Vallejos et al. |
| 2018/0133715 | A1 | 5/2018 | Craig et al. |

* cited by examiner

TARGET PARTICLE EJECTION FROM RECIRCULATING FLUID EJECTION CHANNELS

CROSS-REFERENCE TO RELATED APPLICATIONS

This application is a National Stage Application of PCT/US2020/039789, filed Jun. 26, 2020, which is hereby incorporated by reference in its entirety.

BACKGROUND

Cellular biology is a field of biology that studies the structure, function, and operation of cells. An understanding of the structure, function, and operation of cells provides a wealth of information. For example, once the structure, function, and operation of cells is more fully understood, certain diseases may be prevented and treated.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
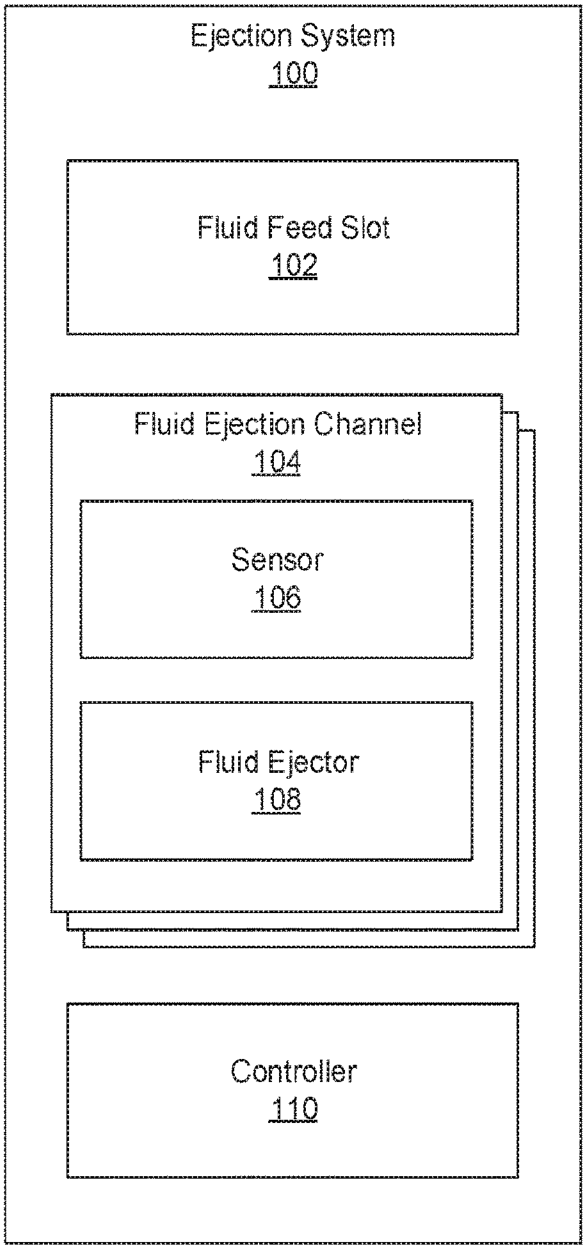
FIG. 1 is a block diagram of an ejection system for target particle ejection from recirculating fluid ejection channels, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Cellular analytics is a field of chemistry that uses instruments to separate, identify, and quantify matter. A wealth of information can be collected from a cellular sample. A greater understanding of the different kinds of cells and their function can lead to certain technological innovations that benefit society in countless ways. For example, from cells, certain biologics such as proteins, insulin, other therapeutic drugs, RNA, and DNA may be synthesized.

However, before a cell can be analyzed, the cells in a sample are first sorted. That is, a sample may have a variety of different cells, and it may be desired to analyze a particular type of cell found within the sample. The presence of non-target cells in a study skew the data and may lead to inaccurate results. Accordingly, the sample is sorted such that the cells to be analyzed are separated from other particles. Efficient cell sorting is helpful for a large number of applications. For example, cell sorting concentrates a population of cells and enhances the accuracy and reliability of any subsequent analytic operation. Effective sorting also makes more efficient use of a sample as there is less waste fluid generated in trying to identify an accurate and satisfactory sample population of cells.

As a specific example, a blood sample may include blood cells and bacterial cells. A sorting system allows for differentiation of the bacteria cells and blood cells such that the bacteria cells can be analyzed without the influence of the blood cells in the population.

While a specific example has been provided, cells of a sample may be sorted for any number of reasons including distinguishing cells, differentiating cells, and detecting diseases to name a few. As cell sorting is a widely-used operation in many cellular analytical applications, enhancements to its efficacy and simplicity may increase its value to cellular analytics.

While some devices may perform cell sorting, such systems are ineffective for a number of reasons. For example, in some cases cells may be sorted by fluorescence activated cell sorting (FACS) and magnetically activated cell sorting (MACS), both of which rely on labels to identify the cells, a single cell at a time. However, the presence of such labels may interfere with cellular operation and analysis of cell functionalities. Accordingly, the present specification provides for such sorting and singulation without labeling agents, thus preserving the integrity of any subsequent operations.

Some label-free separation methods exist. Examples include density gradient centrifugation separation and filtration-based (size and stiffness based) cell separation. However, these operations are carried out on large quantities of cells and properties of individual cells are not measured.

Label-free singulation of cells may involve expensive systems that incorporate video detection integrated with dispensing, or dilution of the cell suspension and portioning the suspension into individual volumes (wells). However, with these methods, a large number of wells may end up without cells and just reagent, while other wells may contain more than one cell. Having wells with one more cell may introduce additional quality control operations which is ineffective and costly.

In some examples, cell ejection occurs via a fluid ejector that ejects cells onto a surface. In these examples, the activation of the fluid ejector moves the fluid past the sensor which distinguishes the cells. That is, as the fluid ejector operates to eject fluid, capillary action draws fluid towards the fluid ejector and past the sensor. Put another way, the fluid ejector acts as a fluid pump.

In such an example where pumping of the of the cell-containing fluid across the sensor is accomplished by a fluid ejector, all the fluid crossing the sensor will be dispensed by the fluid ejector. Accordingly, single cells of different types and sizes, as well as clumps of individual cells may be dispensed. However, dispensing an undesired cell type or a clump of cells into a well where a single cell is desired may negatively affect subsequent operations.

Accordingly, the present specification describes an automated, low-cost single-cell sorting system that separates the movement of fluid from fluid ejection. Accordingly, a fluid ejector can be activated just when a target cell is present, while not inhibiting fluid flow which is provided via a separate device. Put another way, the present specification describes an ejection system that distinguishes between single cell sizes, types, and groups of cells prior to dispensing. Such a system provides for cell sensing, sorting, and dispensing with separate pumping and dispensing operations.

Specifically, the ejection system may include a pump that pumps fluid through a recirculation loop, a sensor placed in the recirculation loop continuously senses fluid circulating to and from a fluid supply. When the sensor detects a single cell of the desired size or type, a fluid ejector fires to dispense it. By comparison, when something other than a single cell of the desired size or type is detected, the fluid ejector is not fired and the pump pumps non-target cells back into the fluid supply.

In some examples, the ejection system includes a single pump/sensor/fluid ejector which dispenses one type of cell into one receptacle well. In another example, the ejection system includes multiple pump/sensor/fluid ejectors to enable detecting different types of cells from the same fluid supply. In this example, each fluid ejector may jet into a different receptacle well, enabling sorting of cell types.

Specifically, the present specification describes an ejection system. The ejection system includes a fluid feed slot to supply fluid to a number of fluid ejection channels, each fluid ejection channel being a recirculating channel. Each fluid ejection channel includes 1) a sensor to detect, in the fluid, a target particle to be ejected and 2) a fluid ejector to eject the target particle from the fluid ejection channel. The ejection system also includes a controller to selectively activate the fluid ejector when the target particle presence is detected. Non-target particles are returned to the fluid feed slot past the fluid ejector.

In some examples, ejection system includes, for each fluid ejection channel, a pump to draw fluid through a respective fluid ejection channel. In an example, the ejection system includes a pump external to the number of fluid ejection channels to draw fluid into each of the number of fluid ejection channels.

In an example, the controller is to count a number of target particles ejected from a fluid ejection channel and selectively activates the fluid ejector based on a count of the number of target particles ejected from the fluid ejection channel.

In an example, the ejection system includes multiple fluid ejection channels, each to eject different target particles. That is, each ejection channel may eject target particles with different characteristics. The characteristics of a particle refer to its chemical and physical structure. For example, a characteristic may be a particle size. Another example of a particle characteristic may be a particle type. Yet another example of a particle characteristic is the capacitance of a cell membrane.

In an example, sensors in different fluid ejection channels may have different characteristics. The characteristics of a sensor refer to its physical attributes. For example, the sensor may have different electrode layouts, different sizes, different geometrical configurations, various number of electrodes etc. In some examples, a fluid ejector is selectively activated based on at least one of a particle size, particle type, and particle count. That is, the method and system may identify the target particle to be ejected based on its size or its type, and may distinguish a single target particle from a clump, or group, of target particles. Once the target particle is identified based on its size and/or its type, the controller selectively activates a fluid actuator to eject the target particle. That is, when an output of a sensor, i.e., an impedance, matches the expected impedance for a target cell, then the controller may determine that the target cell is present in this portion of the fluid stream and may activate the fluid ejector to expel this target cell.

Figure 2:
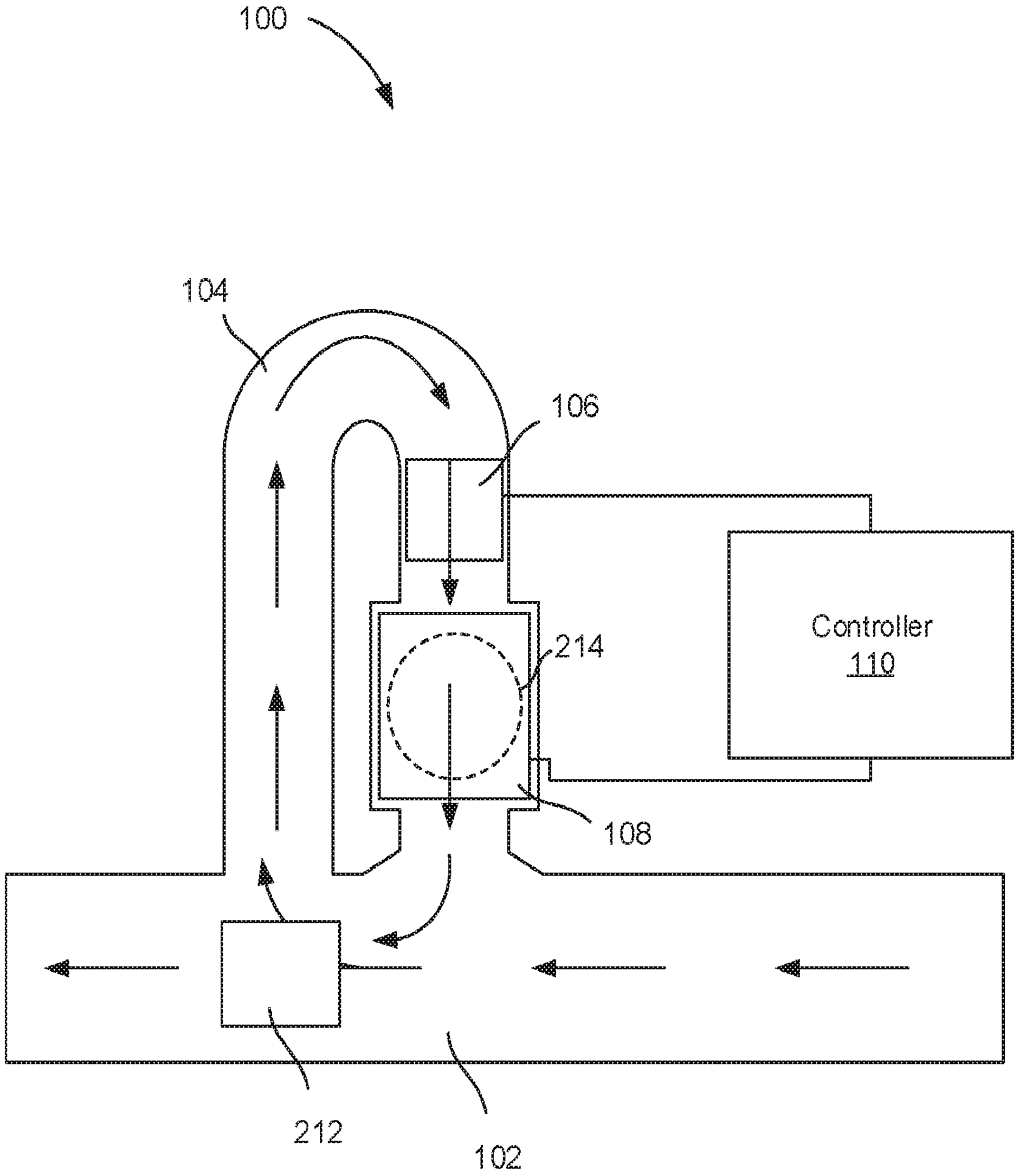
FIG. 2 is a diagram of an ejection system for target particle ejection from recirculating fluid ejection channels, according to an example of the principles described herein.
Figure 5A:
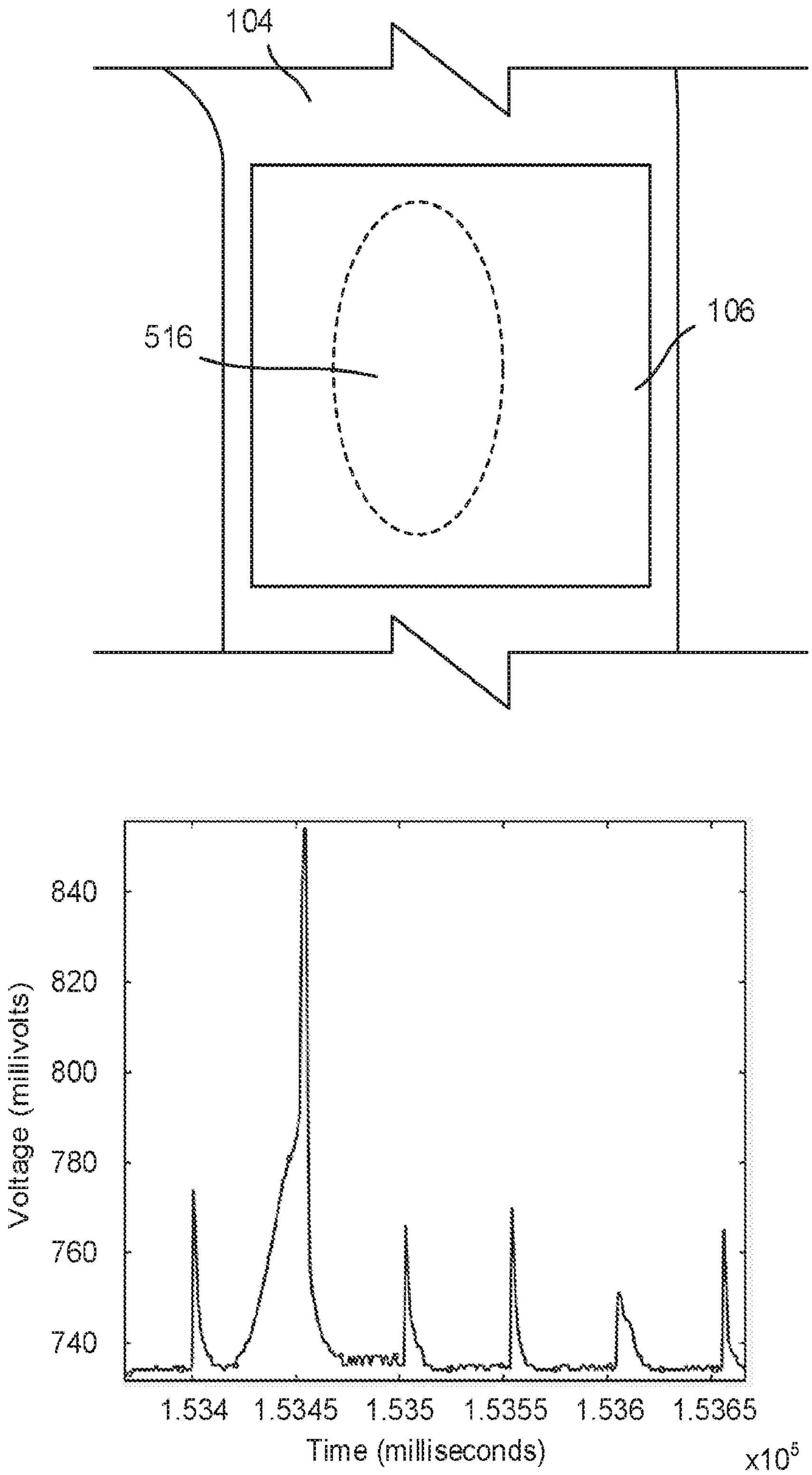
FIGS. 5A and 5B illustrate target particle-based fluid ejection, according to an example of the principles described herein.
Figure 5B:
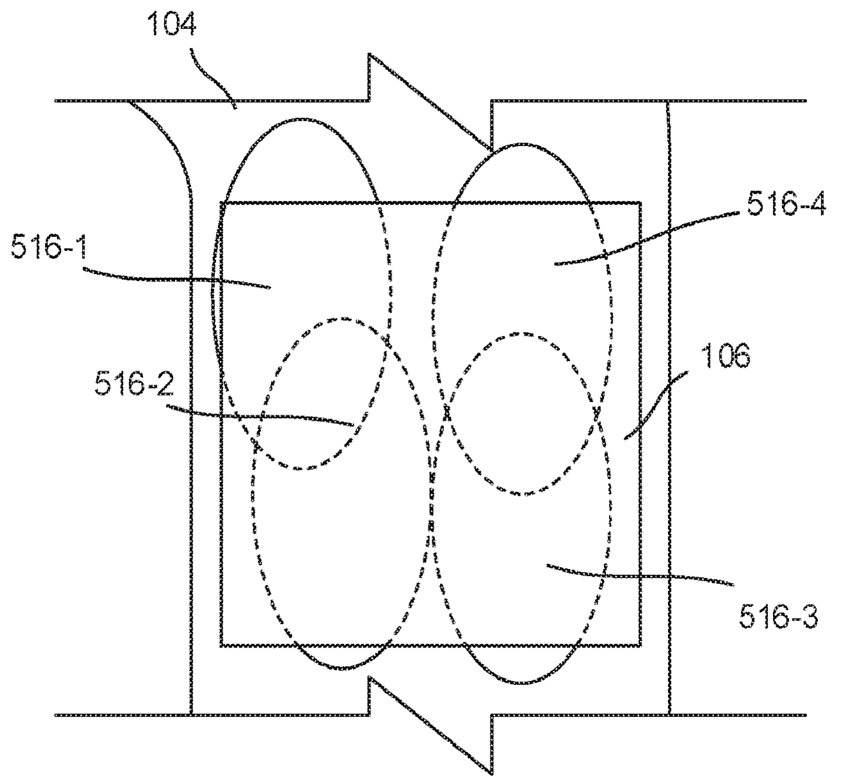
Figure 5B:
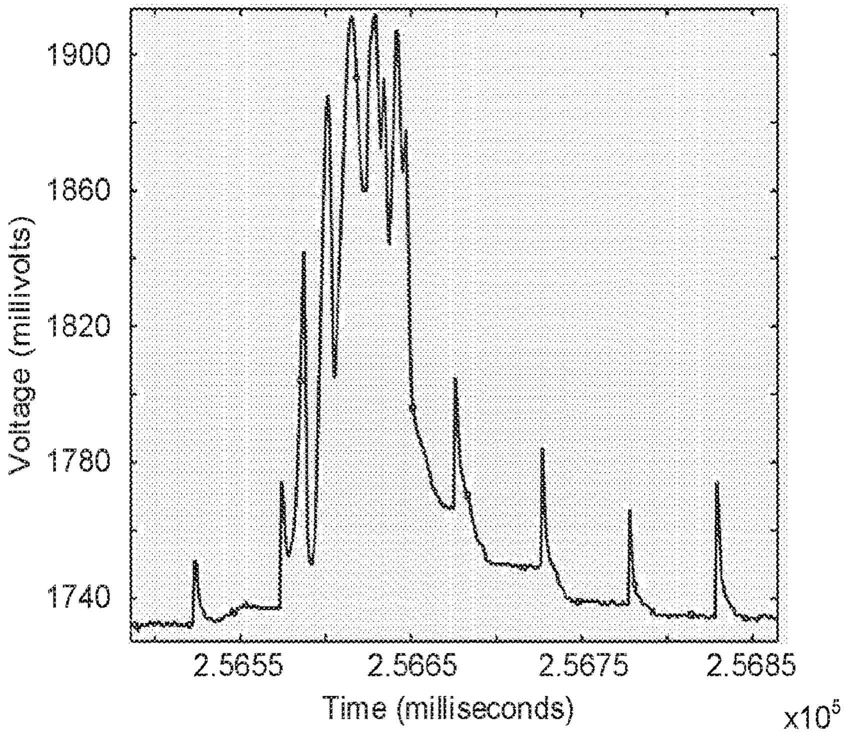

FIGS. 2, 5A, and 5B, below provide additional detail on the selective activation based on particle size, particle type, and particle count.

The present specification also describes a method. According to the method, a sensor output is received, which sensor output is indicative of characteristics of cells passing over a sensor. From the sensor output, the system determines when a target cell is present in a fluid stream. Responsive to the sensor output indicating a presence of the target cell, a fluid ejector is activated to eject the target cell. Responsive to detecting non-target cells, the fluid is returned to the fluid feed slot.

In some examples, target and non-target particles are distinguished based on at least one of frequency, amplitude, and peak shape of an electrical sensor output. In an example, an ejection system includes multiple fluid ejection channels, each with an associated fluid ejector and sensor. In this example, the method includes individually activating different fluid ejectors based on a sensor output from a sensor paired with a respective fluid ejector. The output from each sensor identifies a different target cell.

In an example, the ejection system includes a fluid feed slot to supply fluid to multiple fluid ejection channels. Each fluid ejection channel is to eject target cells with different characteristics and includes 1) a pump to move fluid through a respective fluid ejection channel, 2) a sensor to detect a presence in the fluid of a target cell to be ejected, and 3) a fluid ejector to eject the target cell from the fluid ejection channel. The ejection system also includes a controller. The controller, responsive to detecting a presence of a target cell, activates a fluid ejector to eject the target cell. Responsive to detecting non-target particles, the controller returns the fluid to the fluid feed slot.

In an example, at least one fluid ejection channel is a waste ejection channel to eject waste cells. In an example, the controller receives sensor outputs from multiple sensors. The controller may simultaneously control multiple fluid ejectors.

Note that while the present specification describes cells as a particular type of target particle, the present systems and methods may target and eject other types of particles including beads of various materials such as metal and latex, DNA-functionalized beads, and other microspheres. That is, while target particles may be of a wide-variety of types, in one specific examples, the particles are cells.

While the present specification describes various types and kinds of particles and cells, the present method and system may be implemented to target different kinds of particles and cells. The present specification therefore allows for the isolation of a particle from a sample. As a specific example, it may be beneficial to isolate bacterial cells from a blood sample. In this example, it may be desirable to separate the bacterial cells, and in some cases a single bacterial cell, from a blood sample so that the bacterial cell, its growth, effect on the body, etc. may be independently studied.

In addition to the specific example of separating single cells, such as bacterial cells from a blood sample, other particles may be separated from the fluid in which they reside. Examples of target particles include prokaryotic or eukaryotic cells, viruses, bacteriophages, mycoplasmas, protoplasts, organelles, mammalian and non-mammalian animal cells, plant cells, algae including blue-green algae, fungi, bacteria, protozoa, nucleic acids, amino acids, antibodies, chemical compounds, and beads (which may have a cell or antibody attached thereto), among other types of particles and combinations thereof.

In summary, using such an ejection system 1) allows single cell sorting of a sample; 2) uses fluid ejection to separate cells from carrier fluid; 3) separates fluid pumping and fluid ejecting; 4) increases number of wells with single cells of a desired type; and 5) provides highly accurate cell separation and identification. However, the devices disclosed herein may address other matters and deficiencies in a number of technical areas.

Turning now to the figures, FIG. 1 is a block diagram of an ejection system (100) for target particle ejection from recirculating fluid ejection channels (104), according to an example of the principles described herein. In some examples, the ejection system (100) may be a microfluidic structure. In other words, the components, i.e., fluid feed slot (102), fluid ejection channel(s) (104), sensors (106), and fluid ejectors (108) may be microfluidic structures. A microfluidic structure is a structure of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

To carry out particle ejection, the ejection system (100) includes a variety of sub-components. Specifically, the ejection system (100) includes a fluid feed slot (102) to supply fluid to a number of fluid ejection channels (104). As described above, the fluid feed slot (102) may be a microfluidic structure coupled at one end to a reservoir and directing fluid along a path where it is drawn into fluid ejection channels (104). In some examples, the fluid feed slot (102) is a recirculating slot. That is, fluid is drawn into the fluid feed slot (102) from a reservoir. As the fluid travels along the fluid feed slot (102), the fluid is drawn into the various fluid ejection channels (104). Fluid that is not ejected, or that is not drawn into a fluid ejection channel (104), may be recycled to the fluid feed slot (102) where it is directed back to the reservoir. In some examples, fluid flow through the fluid feed slot (102) is induced.

The ejection system (100) also includes a number of fluid ejection channels (104). The fluid ejection channels (104) may branch off the fluid feed slot (102) and direct portions of the fluid past components which 1) determine the presence of a target particle, 2) eject a target particle, and 3) return a non-target particle to the fluid feed slot (102). That is, the fluid ejection channels (104) may be recirculation channels for which the input and output are fluidly coupled to the fluid feed slot (102). In some examples, such as that depicted in FIGS. 2, 3, and 6, the fluid ejection channels (104) may be U-shaped channels having a smaller cross-sectional area than the fluid feed slot (102). In some examples, each fluid ejection channel (102) may detect, and eject, different types of target particles. For example, a first fluid ejection channel (104) may target a particular cell in a fluid while a second fluid ejection channel (104) may sort and eject magnetic beads.

Disposed within each fluid ejection channel (104) is a sensor (106) to detect a presence of a target particle to be ejected. For example, a fluid sample may include human embryonic kidney (HEK) cells which are targeted for ejection into a well for subsequent analysis. For context, HEK cells refer to cells of a specific cell line that may be used in cell research in a variety of applications. For example, they may be used to analyze the effects of medications and interactions between proteins among other cellular analysis operations. In this example, the sensor (106) determines when an HEK cell is passing and sends a signal to a controller (110) which may selectively activate a fluid ejector (108) to eject the HEK cell into a well. The sensor (106) can distinguish a single HEK cell from other types of cells and/or clumps of HEK cells such that just single HEK cells are ejected.

As another example, a blood sample may include blood cells as well as bacterial cells. In this example, a scientist may wish to separate the cells such that the bacterial cells may be analyzed in isolation. Accordingly, the sensor (106) may distinguish between the bacterial cells and the blood cells such that bacterial cells may be separated from the blood cells and passed for processing.

Such a sensor (106) may take many forms. In one example, the sensor (106) is an impedance sensor to measure an electrical conductivity between electrodes of the sensor (106). Such an impedance sensor (106) may include at least one pair of electrodes. As the contents between the electrodes change, so does the electrical impedance between the electrodes. For example, the impedance between electrodes may be different when a particle is present between the electrodes, as compared to when a particle is not between the electrodes. Moreover, different types, sizes, and quantities of particles may change the impedance by different amounts. In some examples, the impedance sensor (106) measures conductivity and an impedance may be determined therefrom. This impedance value may be correlated to identify 1) whether one or multiple particles are passing in a fluid stream and 2) the properties of the particles passing at that moment in time.

As another example, the sensor (106) may be an optical sensor that identifies particles based on a scatter of reflected energy waves. Other examples of sensors (106) include a thermal sensor, or a magnetic field sensor. Thus, in summary, the sensor (106) may determine when a target particle is present in the flow path by distinguishing it from other particles based on at least one of a particle size and particle type. The sensor (106) may also determine when a single, as compared to multiple, target particles are passing by the sensor (106).

Each fluid ejection channel (104) may also include a fluid ejector (108) to eject the target particle from the fluid ejection channel (104). That is, the ejection system (100) may be disposed above a surface onto which a target particle is to be ejected. As a specific example, the ejection system (100) may form part of a fluid analysis system that includes a stage to hold a well plate. It may be desirable to dispense target particles into individual wells of the well plate. Accordingly, the ejection system (100) includes fluid ejectors (108) that expel the target particles through openings towards the individual wells of the well plate.

The fluid ejector (108) may include a firing resistor or other thermal device, a piezoelectric element, or other mechanism for ejecting particles from the firing chamber. For example, the fluid ejector (108) may be a firing resistor. The firing resistor heats up in response to an applied voltage. As the firing resistor heats up, a portion of the fluid adjacent the firing resistor vaporizes to form a bubble. This bubble pushes the cell to be analyzed out an orifice and onto a surface such as a micro-well plate. As the vaporized fluid bubble collapses, a vacuum pressure along with capillary force draws additional fluid towards the fluid ejector (108), and the process repeats. In this example, the fluid ejector (108) may be a thermal inkjet fluid ejector (108).

In another example, the fluid ejector (108) may be a piezoelectric device. As a voltage is applied, the piezoelectric device changes shape which generates a pressure pulse that pushes a fluid out the orifice. In this example, the fluid ejector (108) may be a piezoelectric inkjet fluid ejector (108).

As described above, the fluid ejector (108) operates responsive to an output of the sensor (106). That is, an output of the sensor (106) may trigger selective activation of a particular fluid ejector (108). When an output of the sensor (106) indicates the presence of a target particle to be analyzed, the fluid ejector (108) may be activated to eject that particle. Such a particle-based ejector activation allows for the precise distinction and separation of particles to be analyzed from other particles that are not desired for a given analytic operation.

The particle ejection system (100) also includes a controller (110). The controller (110) may include various hardware components, which may include a processor and memory. The processor may include the hardware architecture to retrieve executable code from the memory and execute the executable code. As specific examples, the controller as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the controller (110) cause the controller (110) to implement at least the functionality of selectively activating a fluid ejector (108) based on a sensor (106) output.

The controller (110) analyzes outputs from the sensor (106) to determine when a target particle in the fluid stream has passed and subsequently activates the fluid ejector (108) to eject this target particle. By comparison, the controller (110), when no target particle is detected, returns the fluid stream back to the fluid feed slot (102). The controller (110) may do this by preventing activation of the fluid ejector (108) at times when no target particle is detected and/or more than one target particle is detected.

As described herein, the ejection system (100) detects the presence of various target particles, which may include target cells. However, the ejection system (100) may detect and selectively eject other types of target particles. One example of another type of target particle includes magnetic or latex beads that may be included in a fluid sample. Such beads, while used in certain operations, may be targeted for separation. Accordingly, the present ejection system (100) may detect and eject these beads so that the remaining fluid may be analyzed and/or so that the magnetic and or latex beads could be recycled for subsequent use. In yet another example, the beads may be functionalized and include DNA components. For example, the beads may be DNA functionalized magnetic beads used in downstream polymerase chain reaction (PCR) analysis. Similarly, in these examples the DNA-functionalized beads may be separated from other cells in the sample such that they may be used in a PCR operation.

In one particular example, the controller (110) counts the number of target particles ejected from a fluid ejection channel (104) and selectively activates the fluid ejector (108) based on a count of the number of target particles ejected from the fluid ejection channel (104). As a particular example, the controller (110) may count the number of particles within each location/well, before moving to a new location/ejection site.

Figure 3:
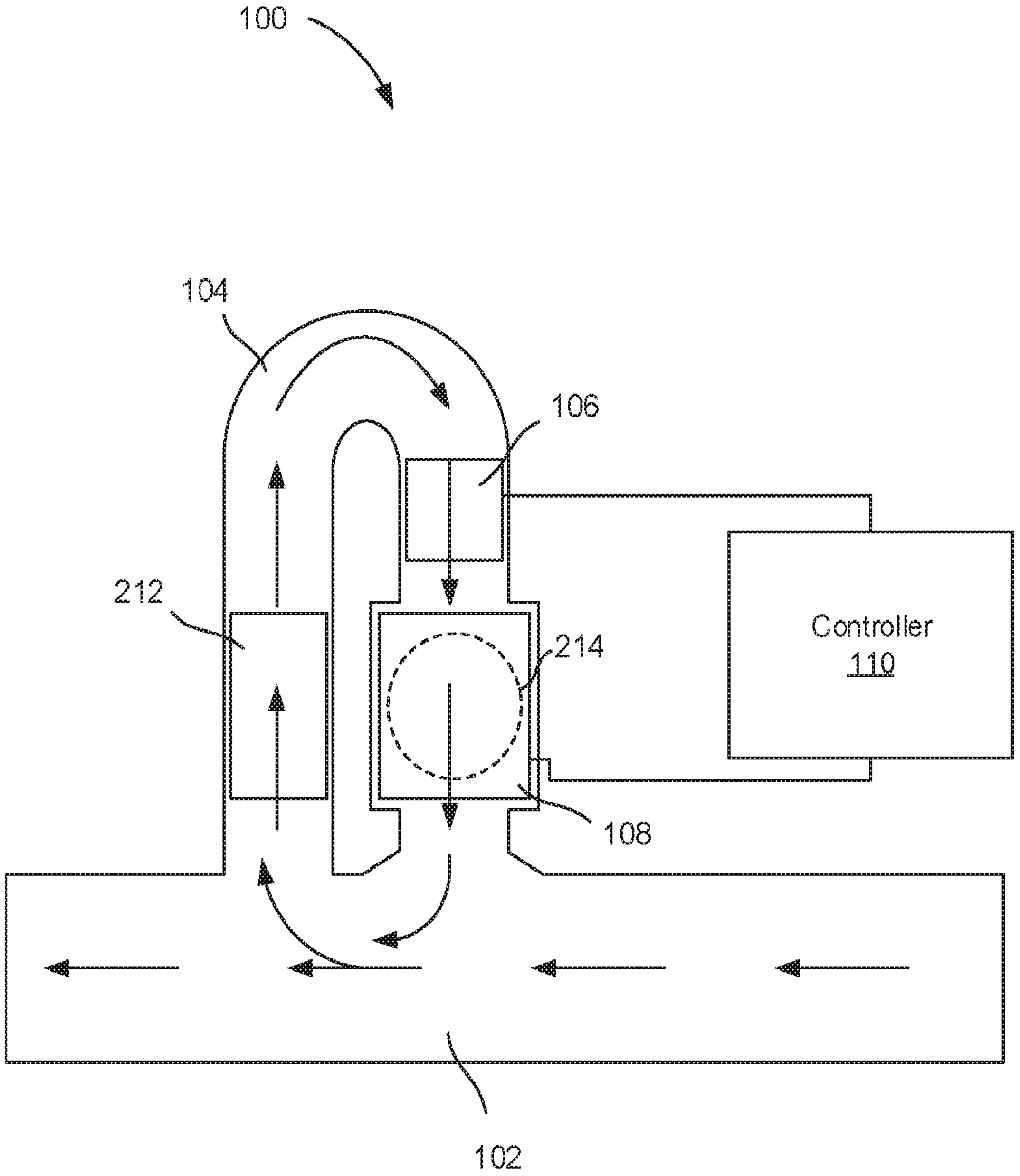
FIG. 3 is a diagram of an ejection system for target particle ejection from recirculating fluid ejection channels, according to an example of the principles described herein.

It should be noted that fluid flow past the sensor (106) is not driven by the fluid ejector (108). Were that the case, all fluid flowing past the sensor (106) would be ejected as stopping activation of the fluid ejector (108) would stop overall fluid flow through the respective fluid ejection channel (104). Accordingly, the fluid flow past the sensor (106) may be independent of the fluid ejector (108). It may be provided, as depicted in FIG. 2, from a pump external to the fluid ejection channel (104) or, as depicted in FIG. 3, from a pump disposed within the fluid ejection channel (104).

In either case, the present ejection system (100) provides an effective and efficient particle sorting mechanism that provides a high yield, is single-particle based which increases the yield, and does not contaminate or potentially damage the particles to be analyzed. Moreover, by excluding undesirable particle types from being analyzed, any scientific results are more particularly mapped to the desired particle. That is, the results of an analysis of a particular particle would not be skewed by analysis of a disparate particle types.

An example of fluid flow through the ejection system (100) is now described. In this example, a sample, such as a blood sample, is held in a reservoir. Flow is induced through the fluid feed slot (102) and into one of potentially many fluid ejection channels (104). As the fluid flows through the fluid ejection channel (104), the sample and its constituent cells pass by the sensor (106). Once a cell to be analyzed is detected, for example a bacterial cell, the controller (110) activates the fluid ejector (108) to eject the bacterial cell through the orifice onto a downstream structure such as a microwell plate.

By comparison, once a cell that is not to be analyzed is detected, for example a blood cell, the controller (110) of the ejection system (100) prevents activation of the fluid ejector (108) to let the blood cell pass by without ejection through the orifice. The blood cell is then recirculated to the fluid feed slot (102) past the fluid ejector (108). Whether or not the fluid ejector (108) is active, a pump (110) (either internal or external) operates to draw fluid through the fluid ejection channel (104). However, when the fluid ejector (108) is not active, the fluid is returned to the fluid feed slot (102).

FIG. 2 is a diagram of an ejection system (100) for target particle ejection from recirculating fluid ejection channels, according to an example of the principles described herein. FIG. 2 clearly depicts the fluid feed slot (102) by which a fluid sample, with cells dispersed therein, is transported past a fluid ejection channel (104). The fluid feed slot (102) and a reservoir together may form a closed loop such that even if fluid with target cells is not drawn into a particular fluid ejection channel (104) on a first pass, it may be drawn in during a second lap around the closed loop.

FIG. 2 also clearly depicts the recirculating fluid ejection channels (104). That is, an inlet and outlet of the fluid ejection channel (104) may be coupled to a same body, i.e., the fluid feed slot (102). Accordingly, while target particles are ejected by the fluid ejector (108) towards a target surface, non-target cells are returned to the fluid feed slot (102) past the fluid ejector (108), which is not activated when non-target cells flow past. The non-target cells re-enter the fluid feed slot (102).

The ejection system (100) may also include at least one pump (212) to, independently of operation of the fluid ejector (108), move fluid through the fluid ejection channel (104). As with the fluid ejector (108), the pump (212) may include a firing resistor or other thermal device, a piezo-electric element, or other mechanism for ejecting particles from the firing chamber. For example, the pump (212) may be a firing resistor. The firing resistor heats up in response to an applied voltage. As the firing resistor heats up, a portion of the fluid adjacent the firing resistor vaporizes to form a bubble. This bubble pushes the fluid through the fluid ejection channel (104). As the vaporized fluid bubble collapses, a vacuum pressure along with capillary force draws additional fluid towards the pump (212) from the fluid feed slot (102), and the process repeats. In this example, the pump (212) may be a thermal inkjet pump (212).

In another example, the pump (212) may be a piezoelectric device. As a voltage is applied, the piezoelectric device changes shape which generates a pressure pulse that pushes a fluid out the orifice. In this example, the pump (212) may be a piezoelectric inkjet pump (212).

As noted above, operation of the pump (212) is independent of operation of the fluid ejector (108). For example, the pump (212) may operate continuously to provide a dynamic fluid stream past the sensor (106). However, the fluid ejector (108) is just active when an output of the sensor (106) indicates a particular target particle is present. That is, the pump (212) circulates fluid through a loop containing a sensor (106). The electrical sensor (106) senses continuously as the fluid is circulated to and from the fluid feed slot (102). The pumping/sensing continues until a single particle of the desired size or type is detected. At this point, the controller (110) activates the fluid ejector (108) and the single particle is dispensed. Clumps of particles or undesired single particle types detected by the sensor (106) by comparison are pumped back into the fluid feed slot (102) and not ejected by the fluid ejector (108). As such, pumping and dispense functions are separated and are independent.

In some examples, as depicted in FIG. 2, the pump (212) is external to the multiple fluid ejection channels (104) in either the fluid feed slot (102) or somewhere else on the ejection system (100). In another example, such as that depicted in FIGS. 3 and 6, the pump (212) is disposed in each fluid ejection channel (104) to draw fluid through a respective fluid ejection channel (104).

FIG. 2 also clearly depicts the sensor (106) that 1) determines characteristics of the fluid passing by and 2) generates an output that is used by the controller (110) to selectively activate a fluid ejector (108). As described above, the sensor (106) may include two electrodes spaced apart from one another that detect an electrical signal in the gap between the electrodes. The shape and size of the electrical peaks can be used to discriminate between single cells and groups, or clumps, of cells. That is, the presence of a cell between the electrodes will effectively change the electrical conductivity. In some examples, the characteristics of the cells, that is the physical and chemical make-up of the cells, may affect the impedance between the electrodes of the sensor (106).

As a first specific example, different types of cells affect the electrical conductivity to different degrees. That is, some cells may have a larger impedance and increase the effective impedance to a different degree as compared to other cells that may have a smaller impedance. As a specific example, bacterial cells may be chemically and/or structurally different from blood cells and the differences therein may lead to each type of cell having a different conductivity and/or impedance. Accordingly, the controller (110) may rely on a mapping between impedance values and cell types to aid in identifying the cell.

As a second specific example, different sizes of cells may affect the electrical conductivity to different degrees. That is, larger cells may have a first impedance which is different than the impedance of smaller cells. Accordingly, the cell size may be determined based on a determined impedance value.

In a third specific example, the sensor (106) may distinguish between a quantity of cells. That is, a quantity of cells between the gap may affect the conductivity. That is, more cells may have a larger effect on impedance than a single cell. Accordingly, the controller (110) may map measured impedance values with a quantity of cells. Accordingly, a distinction may be made between cell types, sizes, and quantities of cells based on the electrical output. FIGS. 5A and 5B specifically depict an example where a single cell is distinguished from a clump of cells.

FIG. 2 also clearly depicts the fluid ejector (108) that ejects target cells through an opening (214). In FIG. 2, the opening (214) is depicted in dashed lines to indicate its position underneath the fluid ejector (108). When anything other than a single target cell is detected by the sensor (106), the controller (110) provides a path of the fluid back to the fluid feed slot (102). This may include not activating, or preventing the activation of, the fluid ejector (108).

Accordingly, the present ejection system (100) allows for the identification of target cells and particles and responsive to this detection, activates a fluid ejector (108) to eject a target cell or particle. Specifically, target cells are identified based on an output of a sensor (106) that the fluid stream passes by. That is, as described above, each cell that passes by the sensor (106) may affect the conductivity between electrodes of the sensor (106) in different ways based on the characteristics of the cell. That is, characteristics such as cell size, cell type, membrane capacitance, and other characteristics may lead to different impedances detected by the sensor (106). A mapping may exist between impedance values and cells such that based on an output of a sensor (106), which may be an electrical impedance, a cell size and a cell type may be determined. For example, as depicted in FIG. 5A, a sensor (106) may output a signal having voltage peak of a certain value having a certain size and shape. This voltage peak may allow the controller (110) to determine that the cell passing by is a single cell, and that it is an HEK cell.

As described above, fluid flow through a fluid ejection channel (104) in such an ejection system (100) is not dependent upon the fluid ejector (108). Were fluid flow dependent upon the fluid ejector (108), the fluid ejector (108) could not be inactive as doing so would stop fluid flow and thereby halt the entire fluid sorting system. Accordingly, by eliminating a dependency of fluid flow on the fluid ejector (108), the fluid ejector (108) can be selectively activated to eject just target cells. By using the pump (212), the fluid ejector (108) may be inactive, and thereby not eject, non-target cells. Doing so increases test accuracy and reliability as non-target cells may be discarded, which non-target cells if not discarded may introduce variation into test results.

FIG. 3 is a diagram of an ejection system (100) for target particle ejection from recirculating fluid ejection channels (104), according to an example of the principles described herein. In the example depicted in FIG. 3, the pump (212) is disposed in the fluid ejection channel (104). However, in this example the pump (212) is still operated independently from the fluid ejector (108) such that fluid is continually circulated through the fluid ejection channel (104) but just target cells are ejected.

Figure 4:
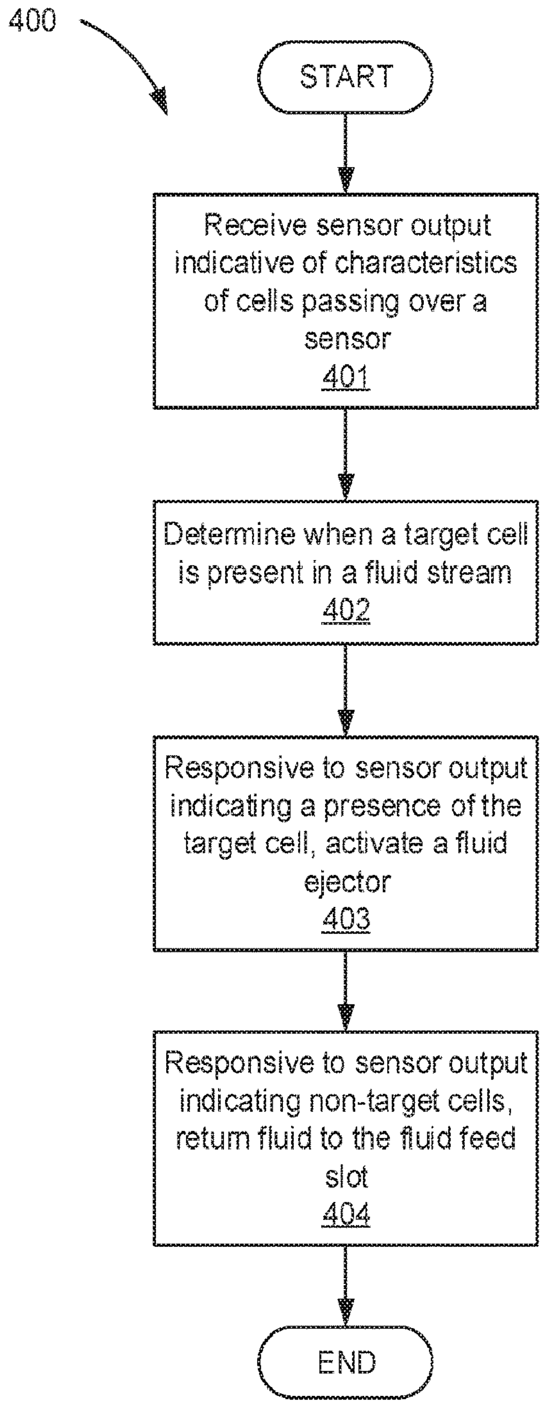
FIG. 4 is a flow chart of a method of target particle ejection from recirculating fluid ejection channels, according to an example of the principles described herein.

FIG. 4 is a flow chart of a method (400) of target particle ejection from recirculating fluid ejection channels (FIG. 1, 104), according to an example of the principles described herein. Such a method (400) ensures that a single instance of a target cell is ejected from the ejection system (FIG. 1, 100). Doing so reduces variance within starting samples, reduces quality control measures as a scientist may have confidence that a particular well includes just a single instance of a target cell, and conserves sample fluids.

According to the method (400), a sensor (FIG. 1, 106) output is received (block 401) at a controller (FIG. 1, 110), which sensor (FIG. 1, 106) output is indicative of characteristics of cells passing over the sensor (FIG. 1, 106). That is, a fluid may include a wide variety of cell types, one of which may be targeted for further analysis. As described above, the cells and samples may be of a variety of types. That is, the cells or particles may be suspended in a variety of appropriate fluids. One example of a fluid in which cells are suspended include a solution of Phosphate Buffered Saline (PBS). Another example, may be a solution of cell growth media matched to the cell type.

As noted above, other examples of cells/particles included in a sample and targeted for ejection may include prokaryotic or eukaryotic cells, viruses, bacteriophages, mycoplasmas, protoplasts, organelles, mammalian and non-mammalian animal cells, plant cells, algae including blue-green algae, fungi, bacteria, protozoa, etc. Other examples of particles within a sample that may be targeted include nucleic acids, amino acids, antibodies, chemical compounds, and beads (which may have a cell or antibody attached thereto), among other types of particles and combinations thereof.

As noted above, other examples of samples from which a target particle/cell is drawn may include whole blood and blood-derived products such as plasma, serum and buffy coat, cerebrospinal fluid or any other body fluids, tissues, cell cultures, cell suspensions, etc.

Characteristics of the cells affect their conductivity. As described above, a characteristic of a cell refers to its physical and/or chemical makeup. Different cells have different characteristics. Some examples of characteristics include a cell size, cell type, and cell membrane capacitance. However, a cell may have other characteristics that affect impedance and/or conductivity. Accordingly, as different cells have different characteristics, i.e., size, type, membrane capacitance, etc., the conductivity between the sensor (FIG. 1, 106) electrodes may change based on the cell present. For example, a cell type, size, and the quantity of cells may affect the conductivity in a particular region of a fluid stream. The sensor (FIG. 1, 106) may detect the conductivity on a scale such that cell sizes and types are identifiable.

Based on the electrical impedance output from each sensor (FIG. 1, 106) the controller (FIG. 1, 110) determines (block 402) when a target cell is present in a fluid stream. That is, the controller (FIG. 1, 110) may consult a database or other data repository that maps electrical conductivity or impedance values to cell size, type, and/or quantity. For example, a database may indicate that when a particular cell is present, a voltage peak will occur at a particular value. Accordingly, when an output of a sensor (FIG. 1, 106) includes a voltage peak at that particular value, the controller (FIG. 1, 110) determines (block 402) that this particular cell is present in a portion of the fluid stream currently underneath the sensor (FIG. 1, 106). Accordingly, the controller (FIG. 1, 110) may subsequently activate the fluid ejector (FIG. 1, 108) when this portion of the fluid stream passes under the fluid ejector (FIG. 1, 108) such that the identified cell is ejected. That is, the controller (FIG. 1, 110) may activate (block 403) the fluid ejector (FIG. 1, 108) following a predetermined amount of time based on the expected flow time between when the cell passes the sensor (FIG. 1, 106) and when the cell is expected to align with the fluid ejector (FIG. 1, 108).

By comparison, responsive to detecting a non-target cell, or not detecting a target cell, fluid is returned (block 404) to the fluid feed slot (FIG. 1, 102), which may include preventing activation of the fluid ejector (FIG. 1, 108). Thus, the present method (400) allows for selectability and control over ejection events such that ejection occurs at desired times, such as when a target cell is present, while avoiding ejection at other times, such as when there is no target cell present or when target cells are in a clump.

While specific reference is made to cell particle ejection, the method (400) may be implemented to eject other types of particles such as magnetic beads, latex beads, DNA-functionalized beads, or microspheres.

FIGS. 5A and 5B illustrate target particle-based fluid ejection, according to an example of the principles described herein. Specifically, FIG. 5A depicts a single HEK cell (516) that has crossed the sensor (106) in the fluid ejection channel (104) and the resulting electrical response. That is, as depicted in FIG. 5A, a particular voltage peak is found at a particular time. Based on historical data, or a particular mapping, the controller (FIG. 1, 110) may, from the output indicated in FIG. 5A, determine that a single instance of an HEK cell (516) is present. Accordingly, the controller (FIG. 1, 110) may selectively activate the fluid ejector (FIG. 1, 108) such that this single HEK cell (516) is ejected onto a surface.

By comparison, FIG. 5B illustrates multiple HEK cells (516) that have crossed the sensor (106) in the fluid ejection channel (104) and the resulting electrical response. As clearly depicted in FIGS. 5A and 5B, the shape and size of the electrical peaks between a single HEK cell (FIG. 5A) and a group of HEK cells (FIG. 5B) are different. This difference is identifiable by the controller (FIG. 1, 110) and can be used to discriminate between single cells and groups of cells. That is, the sensor (106) peak associated with the clump of HEK cells (516) has a different shape and is distinguishable from the smaller peak associated with the single HEK cell (516). Turning specifically to FIGS. 5A and 5B, the controller (FIG. 1, 110) may distinguish between the peaks and may activate the fluid ejector (FIG. 1, 108) when a single HEK cell (516) is detected as indicated in FIG. 5A and may return fluid to the fluid feed slot (FIG. 1, 102) when multiple HEK cells (516-1, 516-2, 516-3, 516-3) are detected as indicated in FIG. 5B.

While FIGS. 5A and 5B depict different peak sizes and shapes based on quantities of shapes, similar peak sizes and shape differences may be found between cells of different types and cells of different sizes. Accordingly, these differences may be detected by the controller (FIG. 1, 110) such that the system may isolate cells of a particular type and/or size.

Figure 6:
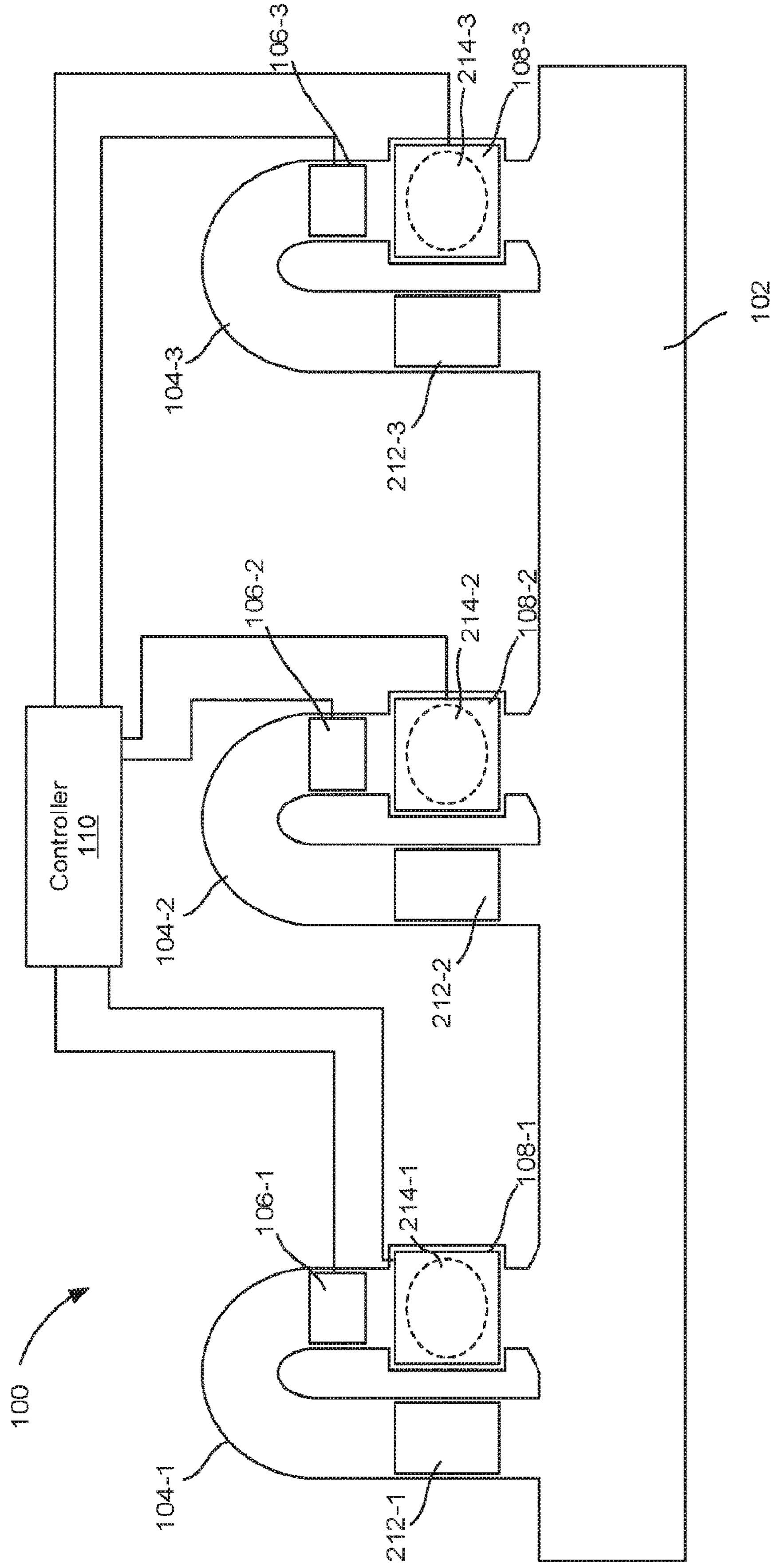
FIG. 6 is a diagram of an ejection system for target particle ejection from recirculating fluid ejection channels, according to an example of the principles described herein.

FIG. 6 is a diagram of an ejection system (100) for target particle ejection from recirculating fluid ejection channels, according to an example of the principles described herein.

Specifically, FIG. 6 depicts an example where an array of pump/sensors/fluid ejectors are connected to the same fluid supply. In this example, the ejection system (100) can sort particles of different types into different receptacle wells. Specifically, in this example, the ejection system (100) includes a fluid feed slot (102) and multiple fluid ejection channels (104-1, 104-2, 104-3). Each fluid ejection channel (104) may eject different target particles. These different particles may have different characteristics and the controller (110) may selectively activate a particular fluid ejector (108) when target characteristics are sensed. For example, a solution including particle type A and particle type B may be introduced into the system. It may be desirable for particle type A to be ejected from a first fluid ejection channel (104-1) into a corresponding well that aligns with the first fluid ejector (108-1) and that particle type B is to be ejected from a second fluid ejection channel (104-2) into a corresponding well that aligns with the second fluid ejector (108-2).

Particle type A may have a size that results in an impedance output having a first value and particle type B may have a size that results in a second, and different impedance value. Accordingly, as particle type A passes by a first sensor (106-1), the controller (110) determines from the electrical response, that particle type A has passed by and particle type A may be ejected from a first fluid ejection channel (104-1). Similarly, as particle type B passes by a second sensor (106-2), the controller (110) determines from the electrical response, that particle type B has passed by and particle type B may be ejected from the second fluid ejection channel (104-2).

Each fluid ejection channel (104) includes a pump (212-1, 212-2, 212-3) to move fluid through a respective fluid ejection channel (104). Each fluid ejection channel (104) also includes a sensor (106-1, 106-2, 106-3) to detect a presence in the fluid of a target particle to be ejected. In this example, the controller (110) receives sensor outputs from the multiple sensors (106) and individually controls multiple fluid ejectors (108-1, 108-2, 108-3) to eject target cells through corresponding openings (214-1, 214-2, 214-3).

In some examples, sensors (106) in different fluid ejection channels (104) have different characteristics. That is, the sensors (106) may be formed of different materials, may have different gaps, etc. As other examples, different impedance sensors (106) may have different electrode layouts. That is, the electrodes of an impedance sensor may have different sizes and/or different geometrical configurations. As another example, different sensors (106) may have different numbers of electrodes. As yet another example, impedance sensors (106) may be operated in either a direct current (DC) or an alternating current (AC) mode. As yet another example, the surface of the sensor (106) electrodes may have a metal surfaces of various materials such as silver or gold, or a dielectric surface made for example of silicon oxide or silicon nitride.

Doing so may allow each sensor (106) to be tailored to identify and sense particular cell types.

For each fluid ejection channel (104), the controller (110) may identify different target cells and may selectively activate the respective fluid ejectors (108) at different points in time. In this example, each fluid ejector (108) is individually controllable. That is, an output of a particular sensor (106) may trigger activation of a corresponding fluid ejector (108), and just that fluid ejector (108). In some examples, each sensor (106) is to determine a presence of a different type of cell.

An example of fluid flow through the ejection system (100) is now described. In this example, a sample, such as a blood sample, is held in a reservoir. As the sample flows through the fluid feed slot (102), portions of the blood sample are drawn into a first fluid ejection channel (104-1) towards a first sensor (106-1). Once a first type of cell is detected, for example a bacterial cell, the controller (110) of the ejection system (100) activates the first fluid ejector (108-1) to eject the bacterial cell through the first orifice (214-1). When cells that are not to be analyzed are detected, for example blood cells, the controller (100) may avoid activating the first fluid ejector (108-1) thus allowing portions to return to the fluid feed slot (102).

Similarly, portions of the blood sample are drawn into a second fluid ejection channel (104-2) and past a second sensor (106-2). Once a second type of cell is detected, for example, a blood cell, the controller (110) of the ejection system (100) activates the second fluid ejector (108-2) to eject the blood cell through a second orifice (214-2). Accordingly, in this example multiple different particle types may be separated from a single sample.

As another example, a sample fluid may contain both HEK and Chinese hamster ovary (CHO) cells. CHO cells refer to cells from an epithelial cell line derived from the ovary of a Chinese hamster. In one example, CHO cells are used in biological and medical research to develop cell lines. As these cells have different sizes, the controller (110) may distinguish them based on the electrical output from different sensors (106). Specifically, HEK cells that are passed through the first fluid ejection channel (104-1) may be ejected while CHO cells that are passed through the first fluid ejection channel (104-1) are not. Further, CHO cells that are passed through the second fluid ejection channel (104-1) may be ejected while HEK cells that are passed through the second fluid ejection channel (104-2) are not. Accordingly, the ejection system (100) provides for the distinction of different cells/particles such that particular cells/particles are ejected into certain locations on a substrate, such as specific wells of a titration plate.

As described above, in some examples, the controller (110) may, per fluid ejector (108), be able to count the number of target cells ejected and may selectively activate/de-activate particular fluid ejectors (108) based on the count. For example, the ejection system (100) may include 20 fluid ejection channels (104) to eject fluid into 20 different wells on a target surface. It may be desirable for each well to have 10 cells disposed therein. It may be the case that a first fluid ejector (108-1) has ejected 10 cells before a second fluid ejector (108-2) has ejected 10 cells. In this example, the controller (110) may stop activating the first fluid ejector (108-1) until the second fluid ejector (108-2) has ejected 10 cells.

In some examples, at least one fluid ejection channel (104) is a waste ejection channel to eject waste. For example, the third fluid ejection channel (104-3) may identify clumps, or non-single groupings, of cells. When such is detected, the controller (110) may activate the third fluid ejector (108-3) to expel this waste fluid.

Figure 7:
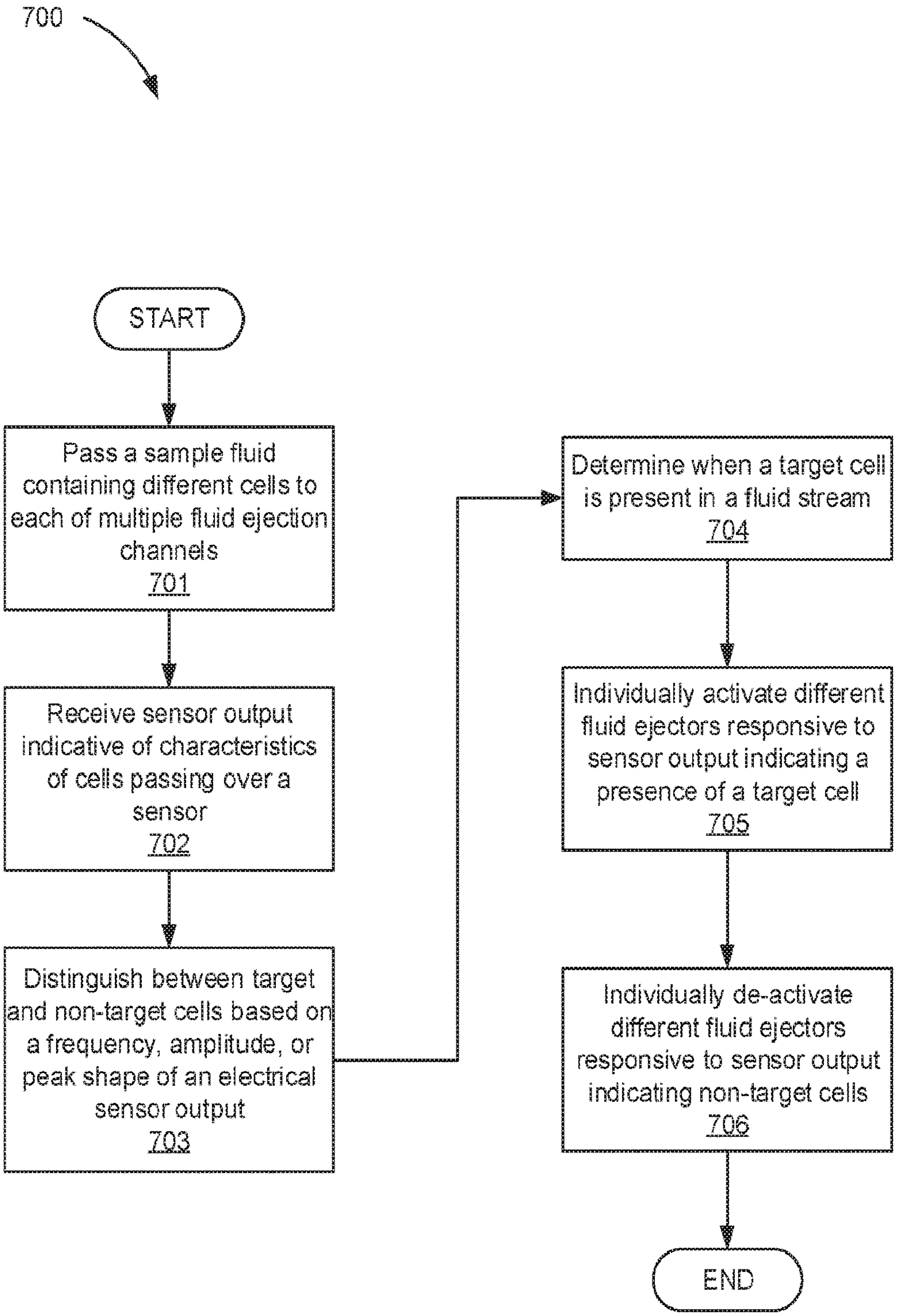
FIG. 7 is a flow chart of a method of target particle ejection from recirculating fluid ejection channels, according to an example of the principles described herein.

FIG. 7 is a flow chart of a method (700) of target particle ejection from recirculating fluid ejection channels, according to an example of the principles described herein. According to the method (700), a sample fluid containing different cells is passed (block 701) to each of multiple fluid ejection channels (FIG. 1, 104). That is, different portions of the fluid passing in the fluid feed slot (FIG. 1, 102) may be drawn into different fluid ejection channels (FIG. 1, 104) based on the action of the respective pumps (FIG. 2, 212).

Sensor (FIG. 1, 106) output indicative of the characteristics of the fluid stream passing through a respective fluid ejection channel (FIG. 1, 104) is received (block 703). This may be done as described above in connection with FIG. 4. Target cells and non-target cells may be distinguished (block 703) based on at least one of frequency, amplitude, and peak shape of an electrical sensor output. That is, as described above, an electrical output may be different based on the cell type and size, and a quantity of cells. Accordingly, the controller (FIG. 1, 110) can distinguish between these different outputs to identify cells and more specifically can distinguish between cells desired to be ejected (i.e., target cells) and those not desired to be ejected (i.e., non-target cells).

Accordingly, it is determined (block 704) when a target cell is present in a fluid stream and different fluid ejectors (FIG. 1, 108) are individually activated (block 705) responsive to an output from a paired sensor (FIG. 1, 106) indicating the presence of a target cell in that fluid ejection channel (FIG. 1, 104). By comparison, fluid is returned (block 706) to the fluid feed slot (FIG. 1, 102) when any sensor detects a non-target cell.

In summary, using such an ejection system 1) allows single cell sorting of a sample; 2) uses fluid ejection to separate cells from carrier fluid; 3) separates fluid pumping and fluid ejecting; 4) increases number of wells with single cells of a desired type; and 5) provides highly accurate cell separation and identification. However, the devices disclosed herein may address other matters and deficiencies in a number of technical areas.

What is claimed is:

1. An ejection system, comprising:

a fluid feed slot to supply fluid to at least one fluid ejection channel;

the at least one fluid ejection channel being a recirculating channel having an inlet and an outlet both fluidically coupled to the fluid feed slot, wherein each of the at least one fluid ejection channel comprising:

a pump to draw fluid through the at least one fluid ejection channel independently of operation of a fluid ejector;

a sensor to detect, in the fluid, a target particle to be ejected;

the fluid ejector to eject the target particle from the fluid ejection channel through an opening; and a controller configured to selectively activate the fluid ejector when a target particle presence is detected to eject the target particle through the opening onto a target surface, wherein non-target particles are returned to the fluid feed slot past the fluid ejector via the outlet.

2. The ejection system of claim 1, wherein the controller is to:

count a number of target particles ejected from the at least one fluid ejection channel; and selectively activate the fluid ejector of the at least one fluid ejection channel based on a count of the number of target particles ejected from the at least one fluid ejection channel.

3. The ejection system of claim 1, wherein the at least one fluid ejection channel comprises multiple fluid ejection channels, each to eject different target particles.

4. The ejection system of claim 3, wherein sensors in different fluid ejection channels have different characteristics.

5. The ejection system of claim 1, wherein the fluid ejector is selectively activated based on at least one of a particle size, particle type, and particle count.

6. A method, comprising:

flowing a fluid containing cells through a fluid ejection channel using a pump, the fluid ejection channel being a recirculating channel having an inlet and an outlet both fluidically coupled to a fluid feed slot;

receiving a sensor output indicative of characteristics of cells passing over a sensor;

determining, from the sensor output, when a target cell is present in a fluid stream;

responsive to the sensor output indicating a presence of the target cell, activating a fluid ejector to eject the target cell through an opening onto a target surface; and responsive to detecting non-target cells, returning the fluid to the fluid feed slot via the outlet, wherein the pump operates independently of the fluid ejector.

7. The method of claim 6, further comprising distinguishing between target and non-target cells based on at least one of frequency, amplitude, and peak shape of an electrical sensor output.

8. The method of claim 6, further comprising:

providing an ejection system comprising multiple fluid ejection channels, each fluid ejection channel having an associated fluid ejector and sensor; and individually activating different fluid ejectors based on a sensor output from a sensor paired with a respective fluid ejector.

9. The method of claim 8, wherein an output from each sensor identifies a different target cell.

10. An ejection system, comprising:

a fluid feed slot to supply fluid to multiple fluid ejection channels;

the multiple fluid ejection channels, each fluid ejection channel being a recirculating channel having an inlet and an outlet both fluidically coupled to the fluid feed slot, each fluid ejection channel to eject target cells with different characteristics and comprising:

a pump to move fluid through a respective fluid ejection channel;

a sensor to detect a presence in the fluid of a target cell to be ejected; and a fluid ejector to eject the target cell from the fluid ejection channel through an opening onto a target surface; and a controller configured to:

responsive to detecting a presence of a target cell, activate the fluid ejector of the respective fluid ejection channel to eject the target cell through the opening onto the target surface; and responsive to detecting non-target cells, return fluid to the fluid feed slot via a respective outlet.

11. The ejection system of claim 10, wherein at least one fluid ejection channel is a waste ejection channel having an outlet fluidically coupled to a waste receptacle to eject non-target cells or clumps of cells.

12. The ejection system of claim 10, wherein the controller receives sensor outputs from multiple sensors.

13. The ejection system of claim 12, wherein the controller simultaneously controls multiple fluid ejectors.

* * * * *